(12) United States Patent
Buck et al.

(10) Patent No.: US 8,248,225 B2
(45) Date of Patent: Aug. 21, 2012

(54) TIRE SENSOR MODULE AND METHOD FOR ITS MANUFACTURE

(75) Inventors: Thomas Buck, Tamm (DE); Thorsten Pannek, Stuttgart (DE); Ulrike Scholz, Korntal (DE); Joerg Muchow, Reutlingen (DE); Gustav Klett, Moessingen (DE); Sonja Knies, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 611 days.

(21) Appl. No.: 12/227,615

(22) PCT Filed: Jul. 9, 2007

(86) PCT No.: PCT/EP2007/056983
§ 371 (c)(1),
(2), (4) Date: Nov. 21, 2008

(87) PCT Pub. No.: WO2008/022842
PCT Pub. Date: Feb. 28, 2008

(65) Prior Publication Data
US 2009/0261962 A1 Oct. 22, 2009

(30) Foreign Application Priority Data
Aug. 21, 2006 (DE) .......................... 10 2006 039 113

(51) Int. Cl.
*B60C 23/00* (2006.01)
(52) U.S. Cl. ............ 340/447; 340/442; 73/146; 29/601
(58) Field of Classification Search .................. 340/447, 340/442; 29/601; 73/146
See application file for complete search history.

(56) References Cited

U.S. PATENT DOCUMENTS

| | | | | |
|---|---|---|---|---|
| 5,573,611 A | * | 11/1996 | Koch et al. | 340/447 |
| 6,580,363 B1 | * | 6/2003 | Wilson | 340/445 |
| 6,788,192 B2 | * | 9/2004 | Shimura | 340/447 |
| 6,885,291 B1 | * | 4/2005 | Pollack et al. | 340/445 |
| 7,215,244 B2 | * | 5/2007 | Katou et al. | 340/447 |
| 7,252,010 B2 | * | 8/2007 | Ohta et al. | 73/754 |
| 7,375,626 B2 | * | 5/2008 | Ening | 340/447 |
| 7,746,285 B2 | * | 6/2010 | Forster et al. | 343/806 |
| 2001/0030601 A1 | * | 10/2001 | Nigon et al. | 340/445 |
| 2002/0046599 A1 | * | 4/2002 | Chuang et al. | 73/146 |
| 2005/0099283 A1 | * | 5/2005 | Johnson et al. | 340/447 |
| 2006/0032299 A1 | * | 2/2006 | Naidu et al. | 73/146 |
| 2006/0244581 A1 | * | 11/2006 | Breed et al. | 340/447 |
| 2009/0102633 A1 | * | 4/2009 | Ebinuma et al. | 340/442 |

FOREIGN PATENT DOCUMENTS

| | | | |
|---|---|---|---|
| DE | 10142354 | * | 3/2004 |
| JP | 2002-339610 | | 11/2002 |
| JP | 2004/330842 | * | 11/2002 |
| JP | 2005-164356 | | 6/2005 |

* cited by examiner

*Primary Examiner* — Eric M Blount
(74) *Attorney, Agent, or Firm* — Kenyon & Kenyon LLP

(57) ABSTRACT

A tire sensor module having a circuit carrier, on or in which at least one sensor element is attached for measuring a measured variable, an antenna for transmitting sensor signals to a receiving unit of the vehicle, and a housing, in whose housing inner chamber the circuit carrier is received, the antenna being provided in the housing material of the housing or on a housing side of the housing.

22 Claims, 3 Drawing Sheets

TIRE SENSOR MODULE AND METHOD FOR ITS MANUFACTURE

FIELD OF THE INVENTION

The field of the invention relates to a tire sensor module.

BACKGROUND INFORMATION

Tire sensors are used in particular for measuring the tire pressure, i.e., as so-called tire pressure monitoring systems (TPMS). They are typically attached as sensor modules to the rim or the valve of the tire and transmit their data wirelessly with the aid of an antenna to a receiving unit of the vehicle, which relays the data to a central control unit of the vehicle.

The antenna is generally provided as a wire outside the sensor. During the mounting of the sensor module in the tire by being vulcanized in, for example, the antenna is therefore to be oriented in accordance with its design, which correspondingly results in complex mounting steps.

SUMMARY OF THE INVENTION

According to the exemplary embodiments and/or the exemplary methods of the present invention, the antenna of the tire sensor module is provided in or on the housing of the tire sensor module, i.e., it is not provided in the housing inner chamber or outside the housing, but rather is provided in the housing material, i.e., integrated, or is implemented on a housing side. In particular, it may be implemented on the housing interior side.

The antenna thus may not be deformed or changed in its orientation during vulcanization, as is possible with configurations outside the housing. Furthermore, the antenna also does not occupy any installation space in the housing interior chamber, in which the circuit carrier having at least the sensor element and possibly further components is attached. Therefore, a larger housing interior chamber is available as the sensor installation space at a given housing size. The antenna may nonetheless be designed with a substantial antenna length, in that it extends with the corresponding length in or on the housing.

According to a specific embodiment, at least the housing, but advantageously both the housing and also the circuit carrier, is designed to be rotationally symmetric. The antenna may run in a coil or helix in or on the housing and thus occupy a large antenna length. With a helix shape of this type, the antenna properties, in particular the emission characteristic, are essentially isotropic and/or uniform in the plane perpendicular to the coil axis.

The tire sensor module according to the present invention may thus be attached without orientation in the tire; it may be vulcanized into the rubber material, in particular in the area of the running surface, for example.

According to a first alternative specific embodiment, the antenna may be implemented on one housing side, which may be the housing interior side, as an antenna metal layer. A laser direct structuring method (LDS) is advantageously used for this purpose, at least one area of the housing being manufactured from a laser-activatable thermoplastic.

A manufacturing method of this type has the essential advantage that the geometry of the antenna may be adapted flexibly to the various applications. In the laser direct structuring method, a writing exposure method is used, so that only the data set, e.g., a CAD/CAM data set of the laser controller, is to be altered for different variants.

According to a second alternative specific embodiment thereto, the antenna may be laid as a metallic inlay part in the injection molding die and then extrusion coated by the housing plastic. This results in a simple and cost-effective manufacturing method.

The circuit carrier may be in contact with the antenna using a conductive adhesive bond between the circuit carrier and housing, the gluing allowing secure accommodation of the circuit carrier in the housing. Instead of the conductive adhesive bonds, pressure contacts, clamp connections, or press-in connections are also possible, so that no gluing is required during the final mounting of the circuit board in the housing. Furthermore, a contactless, in particular an inductive or capacitive connection of the antenna to the circuit carrier is also possible, so that no complex electrical contacting is required between the circuit carrier and the sensor housing. The mounting of the circuit carrier in the housing is thus significantly simplified.

The circuit carrier or the substrate may be a circuit board in particular, on which still further components, in particular an analysis and control ASIC and an RF ASIC may be attached in addition to the sensor element or sensor IC. Functions of this type may fundamentally also be partially or entirely integrated on the sensor IC, however.

Fundamentally, the tire sensor module according to the present invention may implement all measuring applications of tire sensors, in particular for measuring the (tire interior) pressure, temperature, or accelerations and/or vibrations. The various functions may also be combined if multiple sensor elements are used.

DETAILED DESCRIPTION

Figure 1:
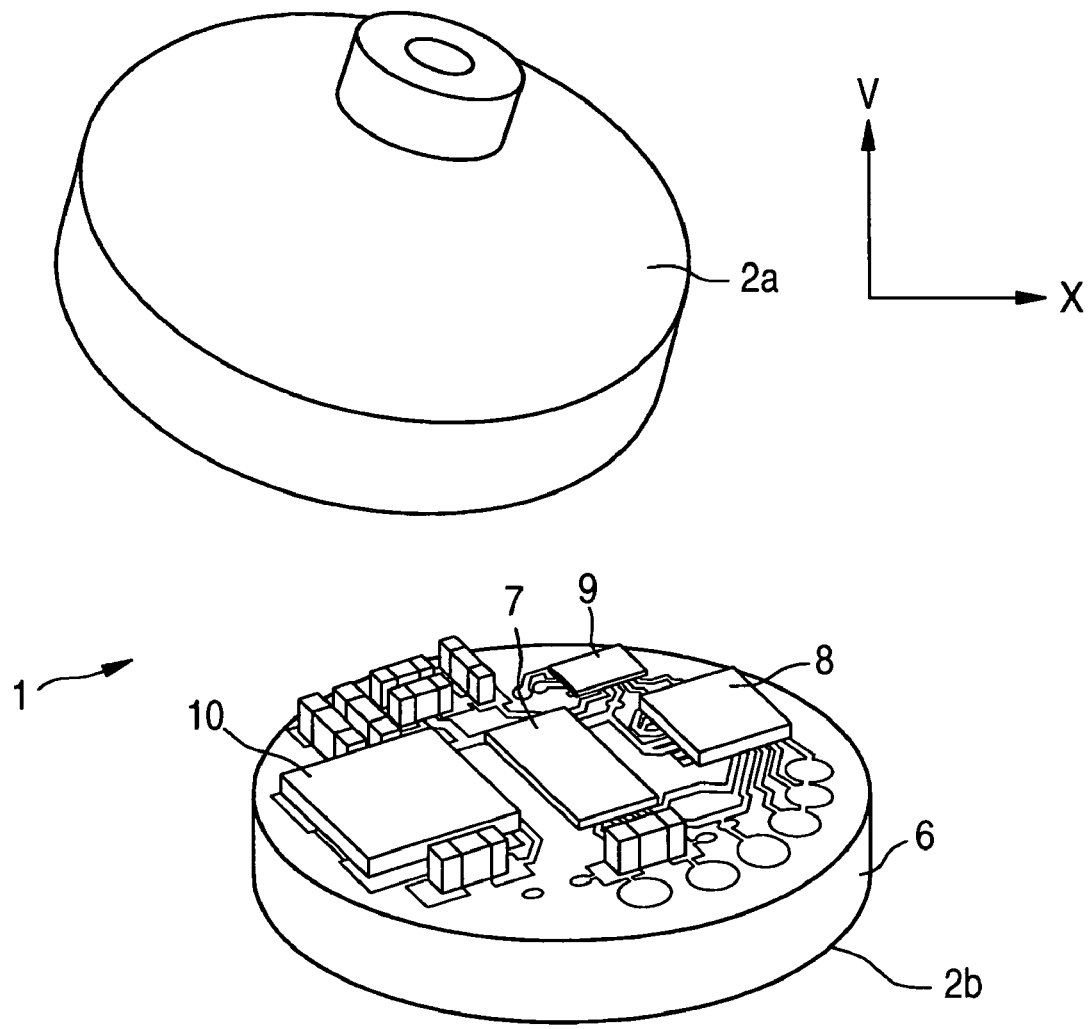
FIG. 1 shows a tire sensor module with an open housing in a perspective view.

A tire sensor module 1 according to the present invention has a housing 2 having an upper housing part 2a and a lower housing part 2b, which are bonded to one another in a weld bond 3 and define a housing chamber 4 between them. Housing 2 is not designed to be hermetically sealed, at least for pressure measurements.

A circuit carrier 6, e.g., a circuit board 6 or also a ceramic substrate, on which a sensor element 7 (sensor IC) and further components are attached, e.g., an analysis and control ASIC 8 for recording the measured values of sensor element 7, possibly also for analyzing these measured signals, an RF ASIC 9, and an oscillator 10, is accommodated in housing chamber 4. Circuit carrier 6 may be placed on a shoulder 11 of housing part 2a, for example.

Sensor element 7 may be used for measuring different measured variables, in particular for measuring the tire pressure, as well as for measuring the internal temperature in the tire or accelerations and/or vibrations. Tire sensor module 1 may in particular also have multiple sensor elements 7 for measuring multiple status variables or measured values of this type.

Figure 2:
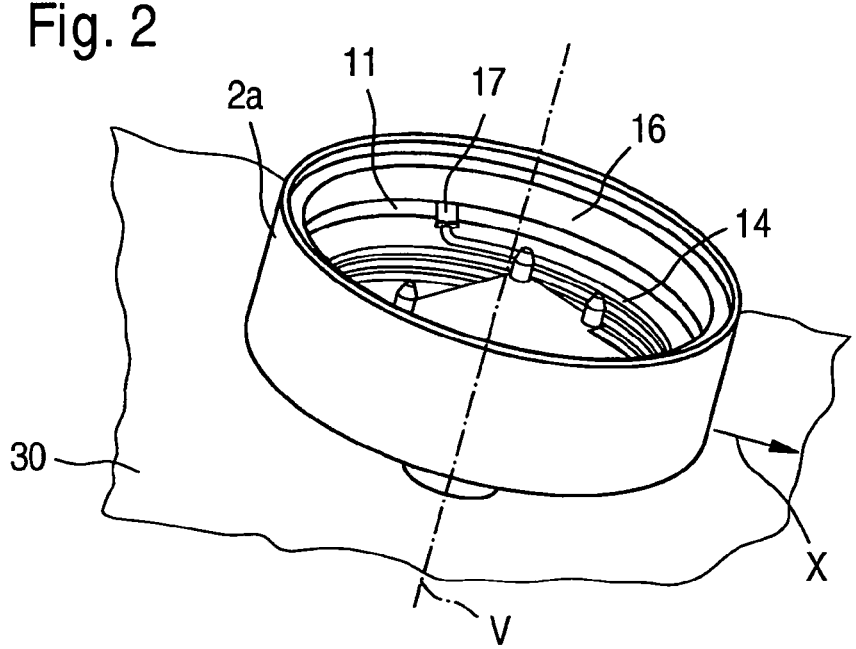
FIG. 2 shows a perspective view of a housing part having an antenna according to a first embodiment.
Figure 3:
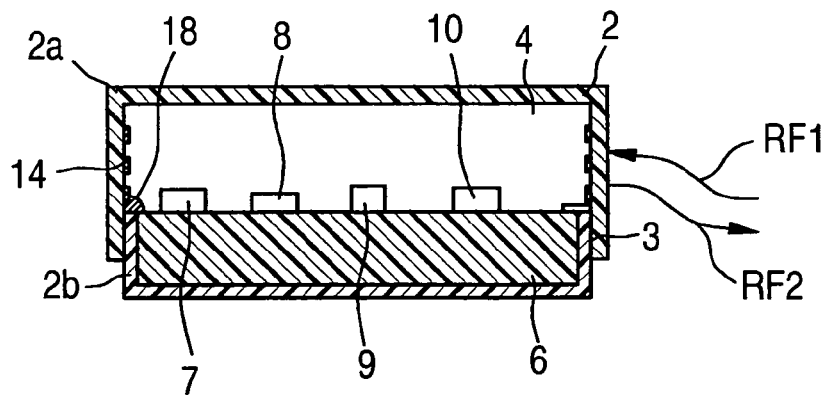
FIG. 3 shows a cross section of the tire sensor module of the first embodiment having a coated antenna.

An antenna 14, 24 is implemented in or on housing 2 according to the present invention, i.e., not in housing inner chamber 4 or outside housing 2, but rather in the housing material or on the interior or exterior side. According to the first embodiment of FIGS. 1 through 3, antenna 14 is implemented as a metal layer on interior side 16 of housing 2, e.g., of first housing part 2a. For this purpose, housing 2—or a housing part 2a—is manufactured from a laser-activatable plastic, in particular a thermoplastic, e.g., from polymer types LCP, PA6/6T, or PBT. Plastics of this type are doped using metal-organic substances, which, after being exposed by the laser as activated seed crystals, make subsequent electroless metal plating possible. The metal-organic substance may be dissolved or extremely finely dispersed in the plastic; it may be a chelate complex compound of a noble metal, e.g., based on palladium or copper. Furthermore, a surface structure which is capable of high adhesion during the subsequent wet-chemical metal coating is produced at the plastic-metal interface during laser structuring.

Figure 4:
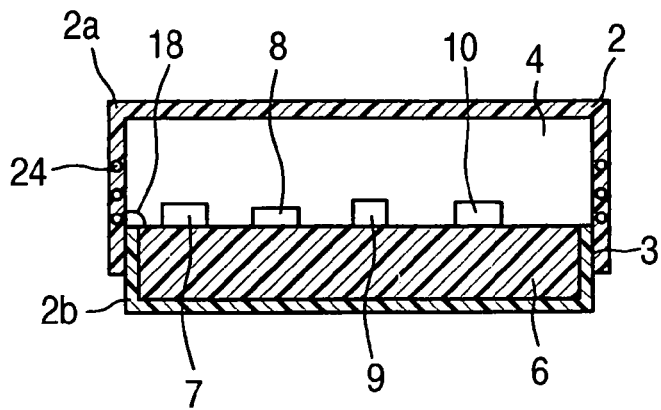
FIG. 4 shows a cross section of the tire sensor module of the second embodiment having an embedded antenna.

According to the second specific embodiment of FIG. 4, antenna 24 is embedded as a metallic insert part 24 in a housing part 2a, for which purpose it is inserted in the injection molding die used during manufacturing.

Antenna 14, 24 may be designed in both specific embodiments as a helix antenna or a screw-like antenna in particular, for which purpose housing 2 is advantageously cylindrical. A substantial antenna length may thus be implemented, the length accordingly resulting from the inner circumference of housing 2 and the number of turns or coils.

Antenna 14, 24 is connected to circuit carrier 6 in an antenna connection 18. According to one embodiment, electrical contacts are possible. An electrical contact of this type may be produced on the one hand in that a conductive adhesive is used at least in the area of the contacting of antenna 14, 24 with circuit carrier 6, i.e., circuit carrier 6 is fastened to shoulder 11 of housing 2 using an adhesive bond 12, adhesive bond 12 or a partial area of adhesive bond 12 being electrically conductive and causing circuit carrier 6 (or a die pad or contact pad of circuit carrier 6) to be in contact with a contact pad 17 of housing 2, at which antenna 14 or 24 is connected. An underfiller may additionally be applied below the circuit carrier to increase the mechanical stability.

Alternatively thereto, designs of antenna connection 18 as pressure contacts, clamp connections, or press-in connections are also possible, so that no adhesive bond 12 is required during the final mounting of circuit carrier 6 in housing 2 and the positioning and fastening of circuit carrier 6 and contacting of antenna 14, 24 may be performed entirely via clamp and catch mechanisms.

Furthermore, antenna connection 18 may also be designed to be contactless, in particular inductive or capacitive, so that the complex electrical connection between circuit carrier 6 and antenna 14, 24 is dispensed with.

Tire sensor module 1 may act in particular as a transponder, which receives query signals RF1 via antenna 14, 24 and produces transmission signals RF2 from measurement signals of sensor element 7, which are in turn transmitted via antenna 14 or 24.

Figure 5:
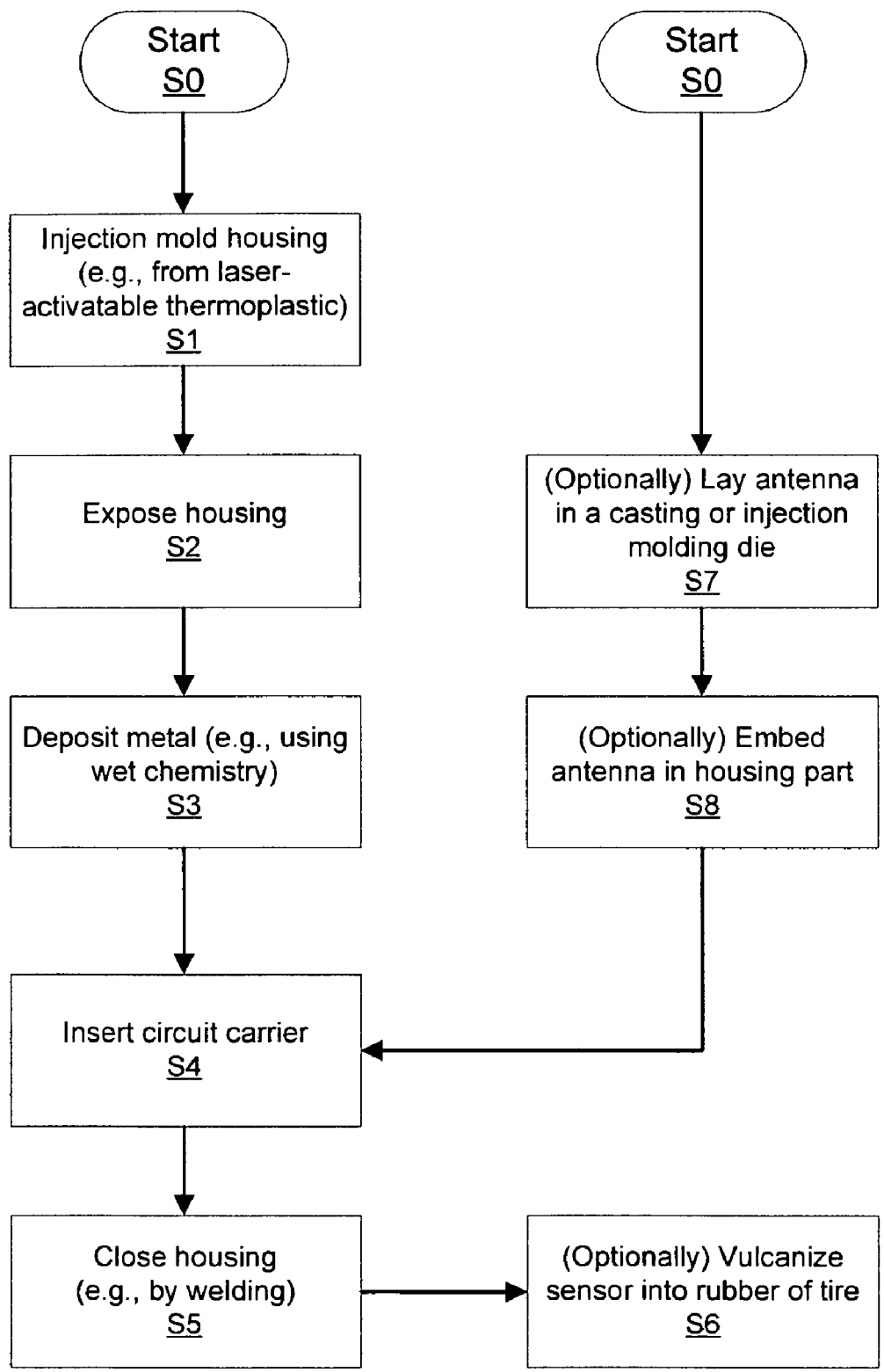
FIG. 5 shows a flow chart of the production method according to the present invention according to the two embodiments.

The manufacturing methods of the two specific embodiments are described in FIG. 5. The production according to the first specific embodiment is performed in that (after the start in step S0) housing 2 or a housing part 2a is injection molded in step S1 from a laser-activatable thermoplastic, and interior side 16 of housing 2 or housing part 2a is subsequently exposed in step S2 as the first processing step of the laser direct structuring method (LDS), after which a metal, e.g. copper, is deposited on the exposed points in step S3 using wet chemistry. The copper may be reinforced and provided with a surface finish made of chemical nickel and immersion gold, for example. In step S4, circuit carrier 6 is inserted in housing 2 or housing part 2a, antenna 14 also being in contact with circuit carrier 6. In step S5, the housing is closed by welding housing parts 2a, 2b.

According to the second specific embodiment, antenna 24 is laid as a metallic insert part in a casting mold or injection molding die in step S7, subsequently embedded in housing part 2a in step S8, and circuit carrier 6 is then inserted in housing 2 or housing part 2a so that antenna 14 is in contact with circuit carrier 6 according to step S4.

Thus manufactured tire sensor module 1 may in particular be vulcanized into the rubber material of a tire 30 in a subsequent step S6. Because tire sensor module 1 is designed to be rotationally symmetric in the specific embodiment shown and its antenna 14 is implemented as at least essentially rotationally symmetric, namely it has an essentially uniform emission characteristic in the plane perpendicular to the coil axis because of the helical shape or coil shape, it is also possible to attach tire sensor module 1 in the tire without orientation in specific planes. Tire sensor module 1 according to the present invention may thus also be vulcanized into the running surface, e.g., in the area of the steel belt.

What is claimed is:

1. A tire sensor module, comprising:
    a circuit carrier, on or in which at least one sensor element is attached for measuring a measured variable;
    an antenna for transmitting sensor signals to a receiving unit of the vehicle; and
    a housing, in whose housing inner chamber the circuit carrier is received, wherein the housing is configured to be rotationally symmetric and the antenna extends in a circumferential direction of the housing,
    wherein at least a part of the housing is manufactured from a laser-activatable plastic and the antenna is provided at a housing side using a laser direct structuring process.

2. The tire sensor module of claim 1, wherein the antenna is provided on a housing interior side.

3. A tire sensor module, comprising:
    a circuit carrier, on or in which at least one sensor element is attached for measuring a measured variable;
    an antenna for transmitting sensor signals to a receiving unit of the vehicle; and
    a housing, in whose housing inner chamber the circuit carrier is received;
    wherein the antenna is provided in the housing material of the housing or on a housing side of the housing, and
    wherein at least a part of the housing is manufactured from a laser-activatable plastic and the antenna is provided on a housing side using a laser direct structuring process.

4. The tire sensor module of claim 1, wherein the antenna is an antenna metal layer.

5. The tire sensor module of claim 1, wherein the antenna is received as a metallic inlay part in the housing material of the housing.

6. The tire sensor module of claim 1, wherein the antenna is screw-like or helical, and hang wherein the antenna has multiple turns.

7. The tire sensor module of claim 1, wherein the antenna is in contact with the circuit carrier via at least one of (i) a conductive adhesive bond, (ii) a pressure contact, and (iii) a press-in or clamp connection between the circuit carrier and the housing.

8. A tire sensor module, comprising:
a circuit carrier, on or in which at least one sensor element is attached for measuring a measured variable;
an antenna for transmitting sensor signals to a receiving unit of the vehicle; and
a housing, in whose housing inner chamber the circuit carrier is received;
wherein at least a part of the housing is manufactured from a laser-activatable plastic and the antenna is provided at a housing side using a laser direct structuring process, and
wherein the circuit carrier is connected to the antenna without contact via one of a capacitive and a inductive antenna connection.

9. The tire sensor module of claim 1, wherein at least one sensor element is provided on or in the circuit carrier for measuring at least one of the following measured variables of pressure, temperature, and acceleration.

10. The tire sensor module of claim 1, wherein the tire sensor triggers as a transponder, and the antenna is for receiving query signals and transmitting sensor signals produced from measured signals of the at least one sensor element.

11. The tire sensor module of claim 1, wherein the tire sensor is introduced into a rubber material of a tire, in an area of the running surface.

12. A vehicle tire, comprising:
a tire sensor module, including:
a circuit carrier, on or in which at least one sensor element is attached for measuring a measured variable;
an antenna for transmitting sensor signals to a receiving unit of the vehicle; and
a housing, in whose housing inner chamber the circuit carrier is received;
wherein:
at least a part of the housing is manufactured from a laser-activatable plastic and the antenna is provided on a housing side using a laser direct structuring process,
the tire sensor module is vulcanized in a rubber material of the tire, in an area of its running surface, and
the housing is configured to be rotationally symmetric and the antenna extends in a circumferential direction of the housing.

13. A method for manufacturing a tire sensor module, the method comprising:
providing an antenna for transmitting sensor signals;
manufacturing a housing or housing part, wherein at least a part of the housing is manufactured from a laser activatable plastic and the antenna is provided at a housing side using a laser direct structuring process; and
inserting a circuit carrier having at least one sensor element, for measuring a measured variable, into the housing or the housing part so that the antenna is in contact with the circuit carrier, wherein the housing is configured to be rotationally symmetric and the antenna extends in a circumferential direction of the housing.

14. A method for manufacturing a tire sensor module, the method comprising:
providing an antenna for transmitting sensor signals;
manufacturing a housing or housing part, in whose housing material or on whose housing side the antenna is provided; and
inserting a circuit carrier having at least one sensor element, for measuring a measured variable, into the housing or the housing part so that the antenna is in contact with the circuit carrier;
wherein the manufacturing of the housing having antenna includes at least the following:
manufacturing the housing or housing part from a laser-activatable plastic;
exposing a housing side using a laser; and
applying the antenna as a metal layer in a wet-chemical manner onto the housing side.

15. A method for manufacturing a tire sensor module, the method comprising:
providing an antenna for transmitting sensor signals;
manufacturing a housing or housing part, in whose housing material or on whose housing side the antenna is provided; and
inserting a circuit carrier having at least one sensor element, for measuring a measured variable, into the housing or the housing part so that the antenna is in contact with the circuit carrier;
wherein the manufacturing of the housing having antenna includes at least the following:
inserting the antenna as a metallic inlay part in an injection molding die; and
extrusion coating a housing or housing part around the antenna.

16. The method of claim 13, wherein the antenna is in contact with the circuit carrier via a conductive adhesive bond which is implemented between the circuit carrier and the housing.

17. The method of claim 13, wherein the antenna is in contact with the circuit carrier via at least one of a clamp connection, a press-in connection, and a pressure contact connection between the circuit carrier and the housing.

18. A method for manufacturing a tire sensor module, the method comprising:
providing an antenna for transmitting sensor signals;
manufacturing a housing or housing part, in whose housing material or on whose housing side the antenna is provided; and
inserting a circuit carrier having at least one sensor element, for measuring a measured variable, into the housing or the housing part so that the antenna is in contact with the circuit carrier;
wherein the antenna is connected to the circuit carrier without contact, and
the antenna is provided at a housing side using a laser direct structuring process.

19. The method of claim 18, wherein at least a part of the housing is manufactured from a laser-activatable plastic.

20. The tire sensor module of claim 1, wherein the antenna is provided in the housing material of the housing or on the housing side of the housing, and wherein the circuit carrier is connected to the antenna without contact via one of a capacitive and a inductive antenna connection.

21. The vehicle tire of claim 12, wherein the antenna is provided in the housing material of the housing or on the housing side of the housing, and wherein the circuit carrier is connected to the antenna without contact via one of a capacitive and a inductive antenna connection.

22. The method of claim 13, wherein the antenna is provided in the housing material of the housing or on the housing side of the housing, and wherein the circuit carrier is connected to the antenna without contact via one of a capacitive and a inductive antenna connection.

* * * * *